(12) United States Patent
Gudavalli et al.

(10) Patent No.: US 12,541,968 B2
(45) Date of Patent: Feb. 3, 2026

(54) CONTROLLED IMAGE MANIPULATIONS USING SEMANTIC LABELS

(71) Applicant: Mayachitra, Inc., Santa Barbara, CA (US)

(72) Inventors: Chandrakanth Gudavalli, Santa Barbara, CA (US); Erik Rosten, Fremont, CA (US); Lakshmanan Nataraj, Chennai (IN); Shivkumar Chandrasekaran, Santa Barbara, CA (US); Bangalore S. Manjunath, Santa Barbara, CA (US)

(73) Assignee: Mayachitra, Inc., Santa Barbara, CA (US)

( * ) Notice: Subject to any disclaimer, the term of this patent is extended or adjusted under 35 U.S.C. 154(b) by 474 days.

(21) Appl. No.: 18/137,268

(22) Filed: Apr. 20, 2023

(65) Prior Publication Data

US 2023/0419655 A1    Dec. 28, 2023

Related U.S. Application Data

(60) Provisional application No. 63/355,151, filed on Jun. 24, 2022, provisional application No. 63/354,884, filed on Jun. 23, 2022.

(51) Int. Cl.
| | |
|---|---|
| G06T 5/00 | (2024.01) |
| G06F 16/29 | (2019.01) |
| G06T 5/50 | (2006.01) |
| G06V 10/74 | (2022.01) |
| G06V 20/13 | (2022.01) |

(52) U.S. Cl.
CPC ............. *G06V 20/13* (2022.01); *G06F 16/29* (2019.01); *G06T 5/50* (2013.01); *G06V 10/761* (2022.01); *G06T 2207/20221* (2013.01)

(58) Field of Classification Search
CPC ...... G06N 3/045; G06N 3/094; G06N 3/0475; G06V 20/13; G06V 10/82; G06V 20/176; G06V 10/761; G06T 2207/10032; G06T 2207/20221; G06F 16/29; G06F 18/214
See application file for complete search history.

(56) References Cited

U.S. PATENT DOCUMENTS

2023/0304826 A1*    9/2023    Zhang .................... G06N 3/047

OTHER PUBLICATIONS

Abady, Lydia, et al. "GAN generation of synthetic multispectral satellite images." Image and signal processing for remote sensing XXVI. vol. 11533. SPIE, 2020.*

(Continued)

*Primary Examiner* — Li Liu

(74) *Attorney, Agent, or Firm* — Schwegman Lundberg & Woessner, P.A.

(57) ABSTRACT

Systems and methods herein describe an image generation system that accesses a semantic map and satellite image, manipulates the semantic map image, trains a machine learning framework using a set of map and satellite image pairs, uses the trained machine learning framework to generate a manipulated satellite image based on the manipulated semantic map, generates a blended satellite image based on a combination of the manipulated satellite image data and the originally accessed satellite image data, and stores the blended satellite image.

20 Claims, 7 Drawing Sheets

(56) References Cited

OTHER PUBLICATIONS

Xu, Chunxue, and Bo Zhao. "Satellite image spoofing: Creating remote sensing dataset with generative adversarial networks (short paper)." 10th International conference on geographic information science (GIScience 2018). Schloss Dagstuhl-Leibniz-Zentrum für Informatik, 2018.*

Wang, Ting-Chun, et al. "High-resolution image synthesis and semantic manipulation with conditional gans." Proceedings of the IEEE conference on computer vision and pattern recognition. 2018.*

Zhu, Jun-Yan, et al. "Unpaired image-to-image translation using cycle-consistent adversarial networks." Proceedings of the IEEE international conference on computer vision. 2017.*

* cited by examiner

CONTROLLED IMAGE MANIPULATIONS USING SEMANTIC LABELS

CLAIM OF PRIORITY

This application claims the benefit of the priority to U.S. Provisional Patent Application Ser. No. 63/354,884 filed Jun. 23, 2022, and U.S. Provisional Patent Application Ser. No. 63/355,151 filed Jun. 24, 2022, each of which are incorporated by reference herein in their entirety.

CONTROLLED IMAGE MANIPULATIONS USING SEMANTIC LABELS

This invention was made with Government support under Contract Number FA8750-16-C-0078 awarded by The Defense Advanced Research Projects Agency, the National Geospatial-Intelligence Agency, and the Air Force Research Laboratory. The Government has certain rights in this invention.

TECHNICAL FIELD

Embodiments herein generally relate to image processing. More specifically, but not by way of limitation, embodiments herein describe controlled image manipulations using semantic labels.

BACKGROUND

Generative Adversarial Networks (GANs) are a class of machine learning frameworks that include two neural networks that are simultaneously trained. The two neural networks include a generative model and a discriminative model. The objective of the generative model is to learn the distribution of the training data to generate new images that are visually similar, while the discriminative model attempts to differentiate between images, both real images and the images generated by the generative model.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
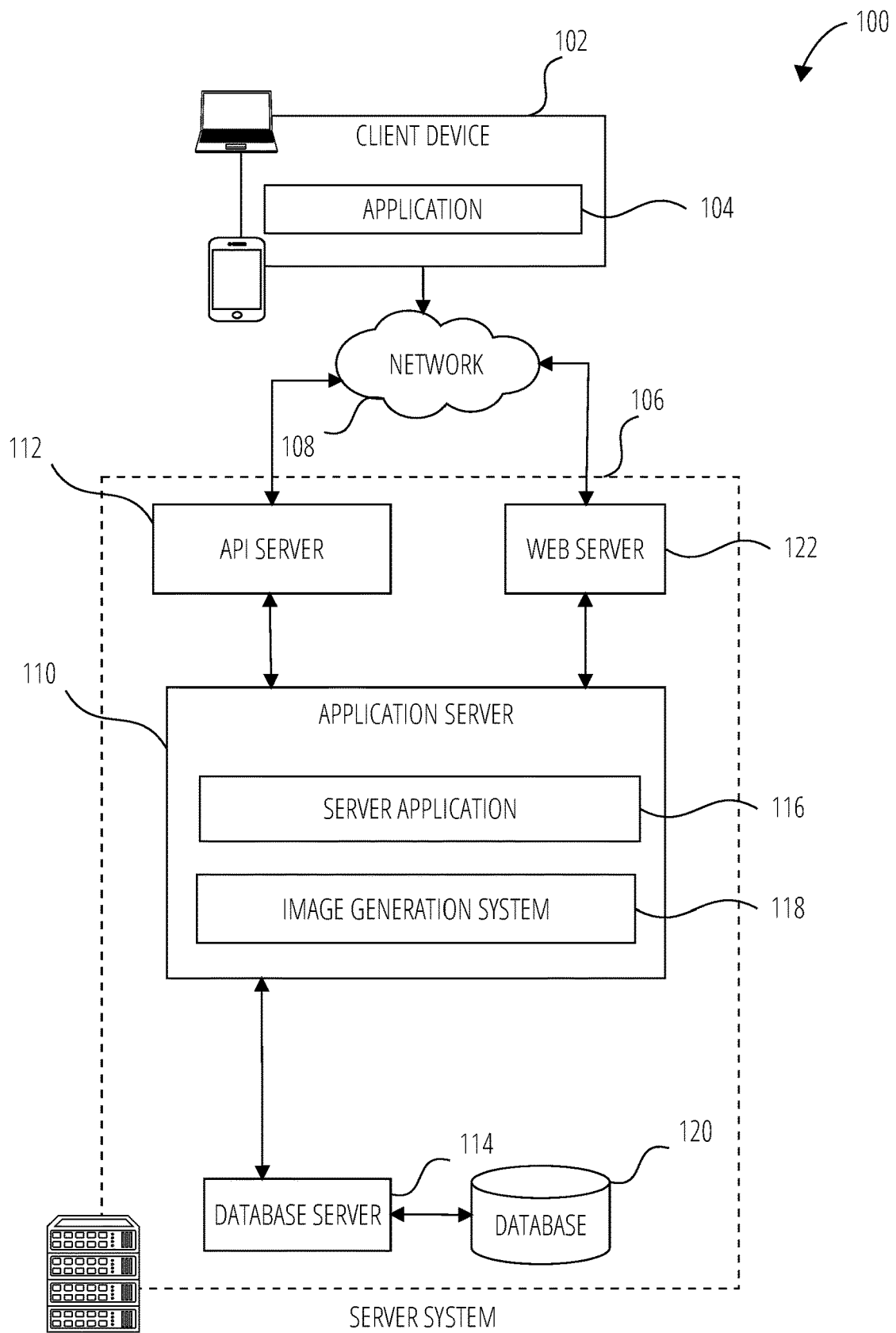
FIG. 1 is a diagrammatic representation of a networked environment in which the present disclosure may be deployed, in accordance with some examples.

Embodiments herein describe an image generation system. The image generation system generates a deepfake satellite image based on a geographical map image. A deepfake image can be any digitally generated image or video that is generated using artificial intelligence. The geographical map image can comprise a semantic map image where each pixel is annotated with predefined labels. The predefined labels can define geographical map features (e.g., buildings, trees, roads, vehicles, water bodies, etc.).

The image generation system accesses a pristine (original and unmodified) geographical map image and modifies (e.g., inserts, removes, and/or substitutes) localized areas and regions in the map image. The image generation system uses the manipulated map image to render an image generated by a generative neural network. For example, the generative neural network is a generative adversarial network (GAN). The GAN-generated image can be a satellite image or any suitable semantic segmentation of the accessed geographical map image.

The image generation system blends the GAN-generated satellite image with a pristine satellite image corresponding to the semantic geographical map image to create a new, deepfake satellite image. The pristine image is an original satellite image corresponding to the geographic area depicted by the semantic geographical map image that has not been previously manipulated. In some examples, the image generation system blends the GAN-generated image with a different image from a training dataset. In other examples, the image generation system does not blend the GAN-generate image with another image.

The image generation system may be used to generate urban planning designs. For example, an urban design may be represented as a map. The image generation system may manipulate the map based on various design choices (e.g., the location of a park or a building can be changed within the map based on an architect's choice). Converting these various designs to images is helpful in visualizing how the planned region will develop.

The image generation system may also be used to visualize agriculture layouts. For example, the map layout of an agricultural field can be modified to make way for new crops, and its corresponding visualization can be seen in advance using the image generation system.

To assess environmental impact and damage that can be caused due to wildfires, it is important to analyze and model how much devastation a wildfire can cause to a given region. This can be achieved by the image generation system which inserts and removes areas in wildfire-prone regions of a geographical map.

In some examples, the image generation system may be used to insert or remove cars, people, or buildings from images, and modify images of paintings to alter the content while preserving the style (e.g., adding a person to Picasso painting).

Since the modeling and manipulation is performed at the map-level, the image generation system generates a blended image of high quality wherein changes to the original image are not perceptible to the human eye.

The image generation system thus solves the technical problem of blending artifacts by inpainting a GAN-generated image into a pristine (or authentic) image.

Networked Computing Environment

FIG. 1 is a block diagram illustrating an example image analysis system 100 over a network. The system 100 includes multiple instances of a client device 102, each of which hosts a number of applications including a client application 104. Each client application 104 is communicatively coupled to other instances of the client application 104 and a server system 106 via a network 108 (e.g., the Internet).

A client application 104 is able to communicate and exchange data with another client application 104 and with the server system 106 via the network 108. The data exchanged between client application 104, and between a client application 104 and the server system 106, includes functions (e.g., commands to invoke functions) as well as payload data (e.g., text, audio, video or other multimedia data).

The server system 106 provides server-side functionality via the network 108 to a particular client application 104. While certain functions of the system 100 are described herein as being performed by either a client application 104 or by the server system 106, the location of certain functionality either within the client application 104 or the server system 106 is a design choice. For example, it may be technically preferable to initially deploy certain technology and functionality within the server system 106, but to later migrate this technology and functionality to the client application 104 where a client device 102 has a sufficient processing capacity.

The server system 106 supports various services and operations that are provided to the client application 104. Such operations include transmitting data to, receiving data from, and processing data generated by the client application 104. This data may include, message content, client device information, geolocation information, as examples. Data exchanges within the system 100 are invoked and controlled through functions available via user interfaces (UIs) of the client application 104.

Turning now specifically to the server system 106, an Application Program Interface (API) server 112 is coupled to, and provides a programmatic interface to the application server 110. The application server 110 are communicatively coupled to a database server 114, which facilitates access to a database 120 in which is stored data associated with data (e.g., images) processed by the application server 110.

The Application Program Interface (API) server 112 receives and transmits image data between the client device 102 and the application server 110. Specifically, the Application Program Interface (API) server 112 provides a set of interfaces (e.g., routines and protocols) that can be called or queried by the client application 104 in order to invoke functionality of the application server 110. The Application Program Interface (API) server 112 exposes various functions supported by the application server 110. Similarly, a web server 122 is coupled to the application server 110 and provides web-based interfaces to the application server 110. To this end, the web server 122 processes incoming network requests over the Hypertext Transfer Protocol (HTTP) and several other related protocols.

The application server 110 hosts a number of applications and subsystems, including a server application 116, and an image generation system 118.

The server application 116 implements a number of data processing technologies and functions. Other processor and memory intensive processing of data may also be performed server-side by the server application 116, in view of the hardware requirements for such processing.

The image generation system 118 supports various data processing services described herein and makes these functions and services available to the server application 116. For some embodiments, the image generation system 118 selectively inserts, removes or replace objects in a given image by manipulating a corresponding semantic map. This is achieved by overfitting GANs on a relatively small dataset of image pairs that are associated with the semantic information of objects present in an image.

The application server 110 is communicatively coupled to a database server 114, which facilitates access to a database 120 in which is stored data associated with images processed by the server application 116.

Figure 2:
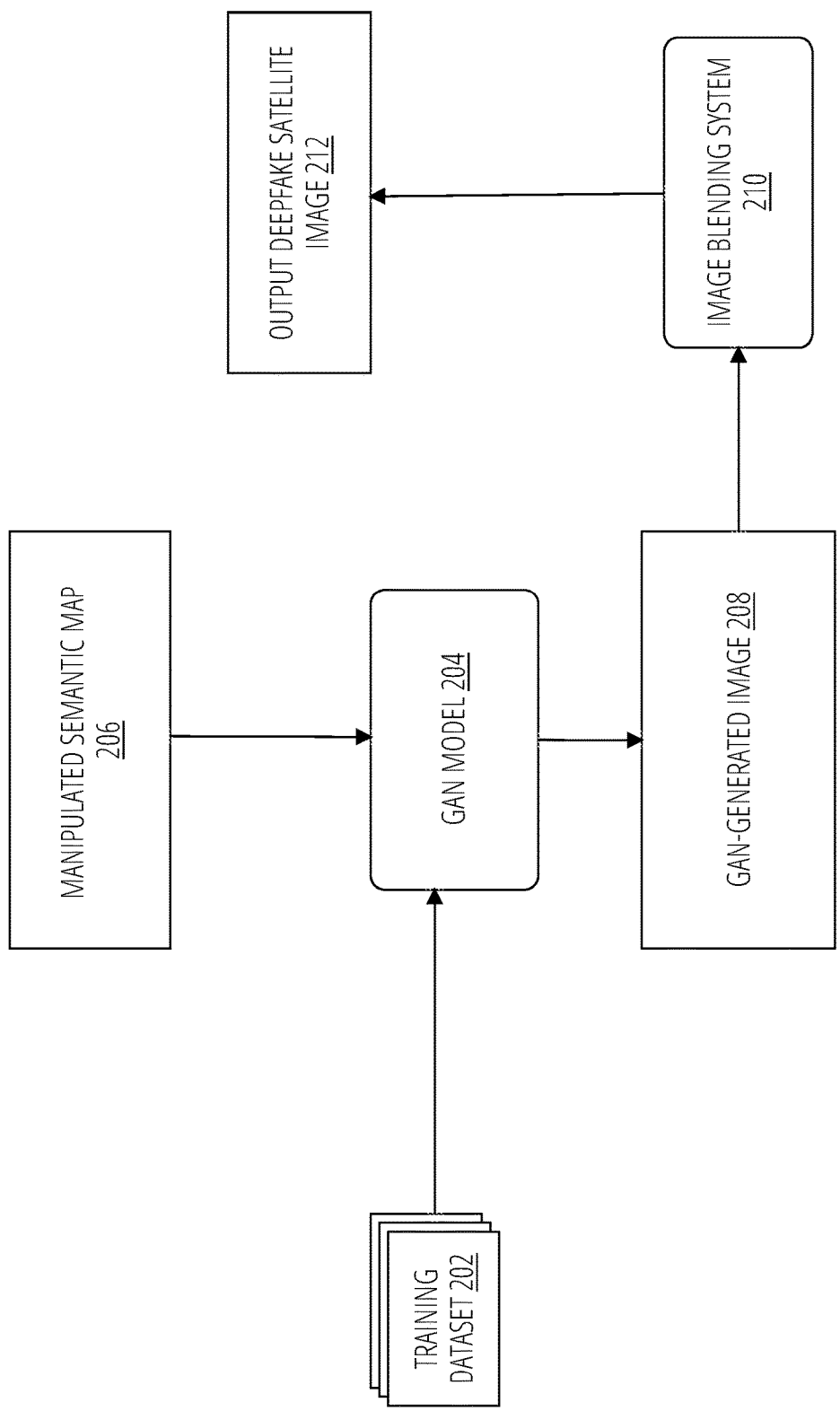
FIG. 2 is an illustration of an image generation system framework, in accordance with some examples.

FIG. 2 is an illustration of the framework of the image generation system 118. The image generation system 118 uses a training dataset 202 to train a GAN model 204. The training dataset 202 includes a set of semantic map image and satellite image pairs. For example, a representative pair of images includes a semantic map image of a geographical area and the corresponding satellite image of a same geographical area. While GANs can generate realistic images across a variety of domains that can look realistic to the human eye, the outputs generated by GANs are prone to occasional artifacts, especially when used on images of a different domain or those that are not present in the training dataset. While the semantic labeling is represented using common colors, the corresponding satellite regions are highly variable depending on the geographical region in which the image pairs are taken. Therefore, the image generation system 118 can constrain the domain of the training set image pairs to specific geographical regions and can overfit the generator network to produce satellite images that are indistinguishable from the original satellite images.

In some examples, the training dataset includes pairs of 512 pixels×512 pixels map and satellite images of capital cities. The latitude and longitude coordinates of each capital city are randomly perturbed ten times within a five-mile radius to obtain multiple images for each city, which differ in appearance. The resulting image pairs are inspected for outliers to constrain the domain of the dataset to urban areas. Outliers include near duplicate images due to random perturbation, images where large regions of the image are not urban regions, images that contain visual artifacts because of stitching images together.

Although the training dataset 202 described uses semantic maps of urban areas, the training dataset can alternatively include semantic maps of different nature than those previously described. For example, instead of using manipulating semantic geographical map images to generate deepfake satellite images, a training dataset 202 can include building segmentation maps to use manipulated building segmentation maps to generate deepfake satellite images.

The GAN model 204 receives a manipulated semantic map image as input. The manipulated semantic image can be created using image editing software to remove, insert and replace objects in the original semantic map image. For example, an image can be manipulated to replace a lake with a set of buildings. The GAN model 204 generates a GAN-generated satellite image 208. Although the direct output of the GAN model 204 can be used as the final deepfake satellite image, the GAN-generated satellite image 208 can also be subsequently blended using the image blending system 210.

The image blending system 210 blends the GAN-generated satellite image 208 with the original, pristine satellite image to bolster the manipulation's authenticity and to ensure that the original pixels are preserved outside of the manipulated region. The final blended image generated by the image generation system 118 is a deepfake satellite image 212. An example blending technique is Poisson Image Editing that can be used to blend the manipulated satellite image and the accessed satellite image. Using a suitable blending technique ensures that the gradients in the original image and the manipulated regions, match. In some examples, the image generation system blends the GAN-generated satellite image 208 with a different satellite image from the training dataset 202. In other examples, the image generation system does not blend the GAN-generate satellite image with another image.

Figure 3:
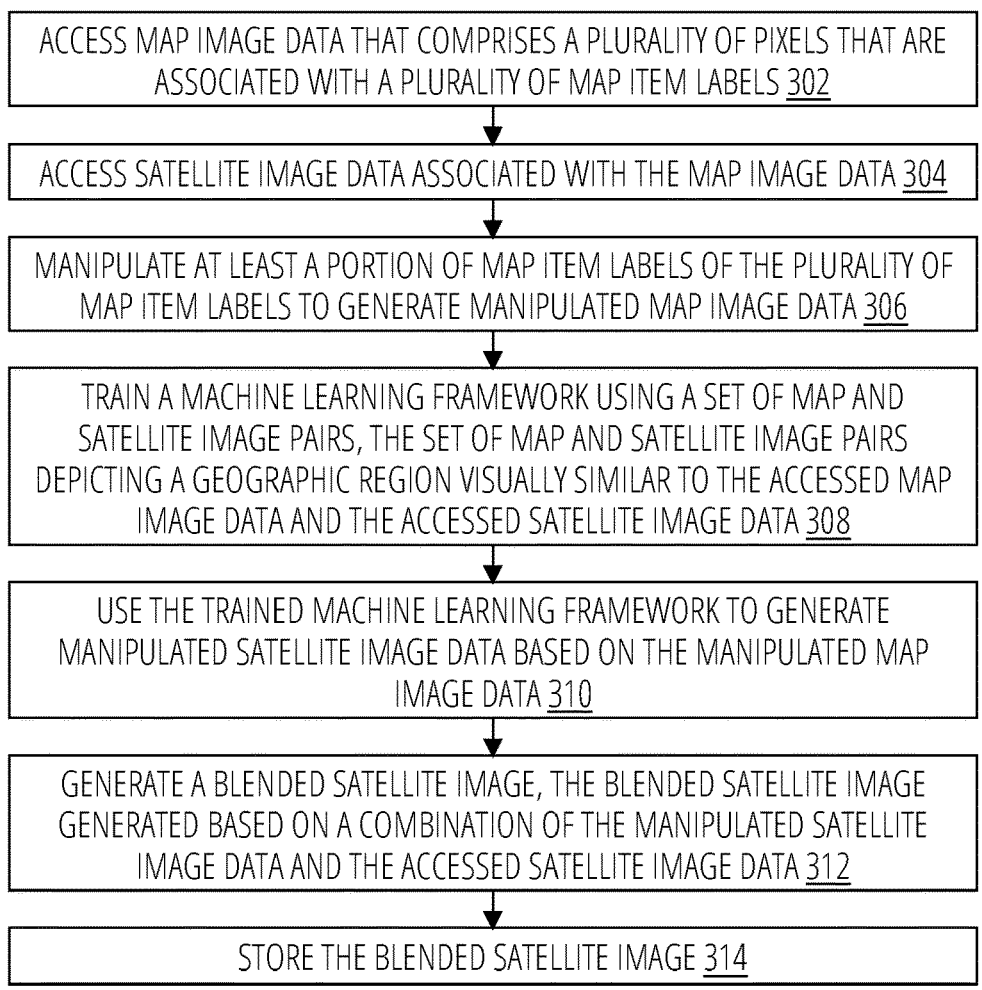
FIG. 3 illustrates a process for generating a manipulated image based on a corresponding semantic segmentation image, in accordance with some examples.

FIG. 3 illustrates a process 300 for generating a manipulated image based on a corresponding semantic segmentation image, in accordance with one example. In one example, the processor of an image generation system 118 can perform the operations in process 300.

At operation 302, the processor accesses map image data comprising a plurality of pixels that are associated with a plurality of map item labels. The map image data is a semantic geographical map image. Each pixel is annotated with a map item label that defines a map feature associated with the pixel. For example, the map item labels identify map features including buildings, roads, vehicles, water bodies, trees, and the like.

In operation 304, the processor accesses satellite image data associated with the map image data. The satellite image is captured from imaging satellites. The satellite image data captures the same geographic area as depicted by the map image.

In operation 306, the processor manipulates at least a portion of map item labels of the plurality of map item labels to generate manipulated map image data. Manipulating the map item labels involves one or more of removing, replacing, and inserting an object depicted in the accessed map image data. Further details of the manipulated semantic map are described above in connection with item 206.

In operation 308, the processor trains a machine learning framework using a set of map and satellite image pairs. The set of map and satellite image pairs depict a geographic region visually similar to the accessed map image data and the accessed satellite image data. A visually similar geographic region includes similar natural geographic features (mountains, water bodies) and engineered geographic features (buildings, roads, railroads, bridges) and need not require the same latitude, longitude coordinates. In some examples, the set of map and satellite image pairs depict a singular and same geographic region as the accessed map image data and the accessed satellite image data. In some examples, the set of map and satellite image pairs may comprise only the accessed map image data and the accessed satellite image data. Further details of the training dataset and the GAN model are described in paragraphs above in connection with the training dataset 202 and GAN model 204, respectively.

The machine learning framework is a GAN framework. It is to be understood that any generative model can be used as the machine learning framework (e.g., variational autoencoders, stable diffusion, and the like).

In operation 310, the processor generates manipulated satellite image data based on the manipulated map image data using the trained machine learning framework. For example, the output of the GAN model 204 is manipulated (e.g., GAN-generated) satellite image data.

In operation 312, the processor generates a blended satellite image, the blended satellite image generated based on a combination of the manipulated satellite image data and the accessed satellite image data. Further details of generating the blended satellite image are described above in connection with the image blending system 210.

In operation 314, the processor stores the blended satellite image. The blended satellite image is a deepfake satellite image (e.g., deepfake satellite image 212) that can be stored in one or more databases 120.

Figure 4:
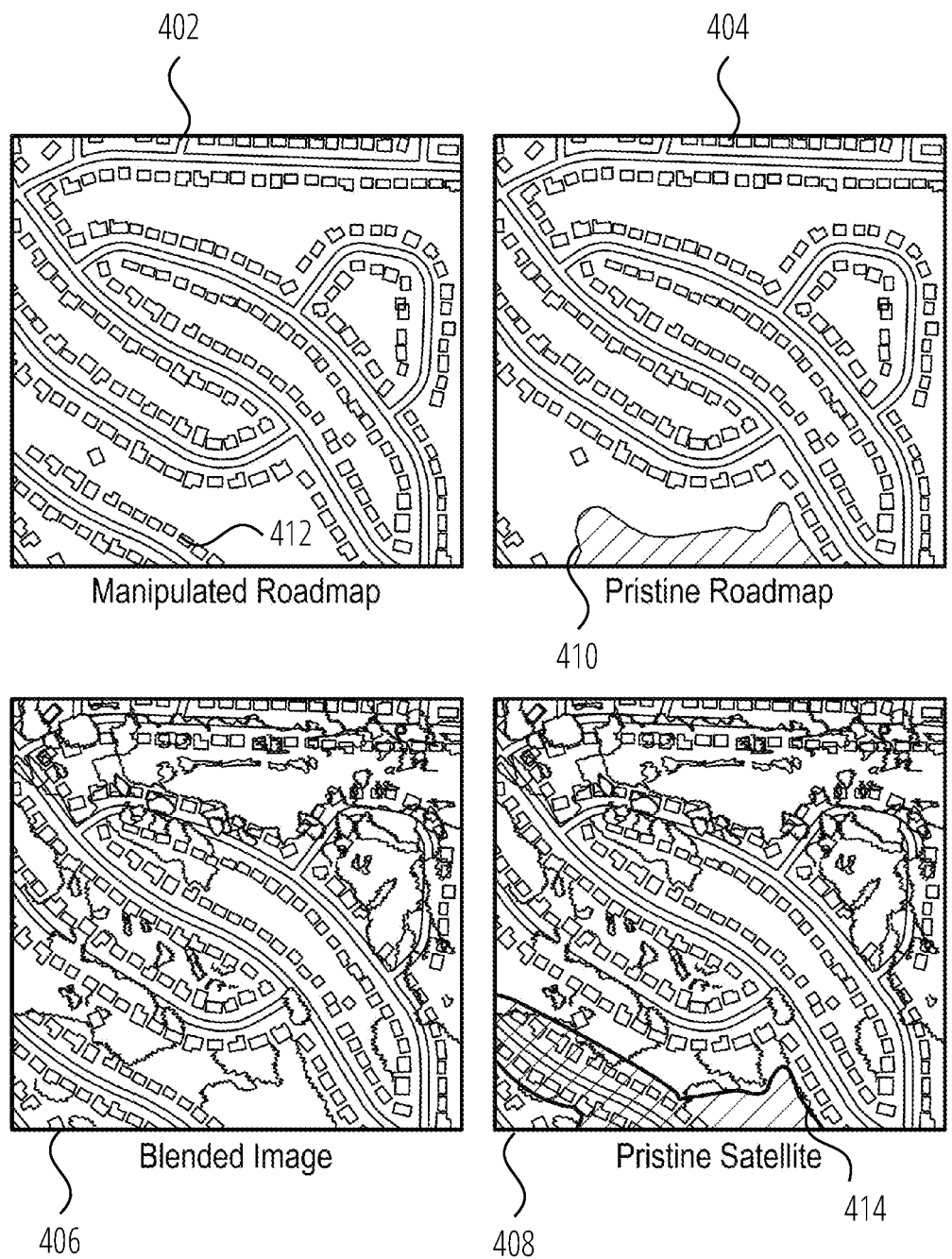
FIG. 4 is an illustration of images accessed and generated by the image generation system, in accordance with some examples.

FIG. 4 is an illustration of images accessed and generated by the image generation system 118. The pristine roadmap 404 is a pristine semantic geographical map. The image generation system 118 accesses the pristine roadmap 404 and modifies it to generate a manipulated roadmap 402. As shown in the figures, the pristine roadmap 404 is shown to include a water body 410. The manipulated roadmap 402, has buildings 412 in place of the water body 410. The manipulated roadmap 402 is provided as input to the GAN model 204. The GAN model 204 generates a deepfake satellite image (not pictured). The deepfake satellite image is blended with the pristine satellite image 408 to generate the blended satellite image 406. The pristine satellite image 408 is shown to highlight the region 414 marked by a thick solid boundary, that has been modified in the blended image 406.

Figure 5:
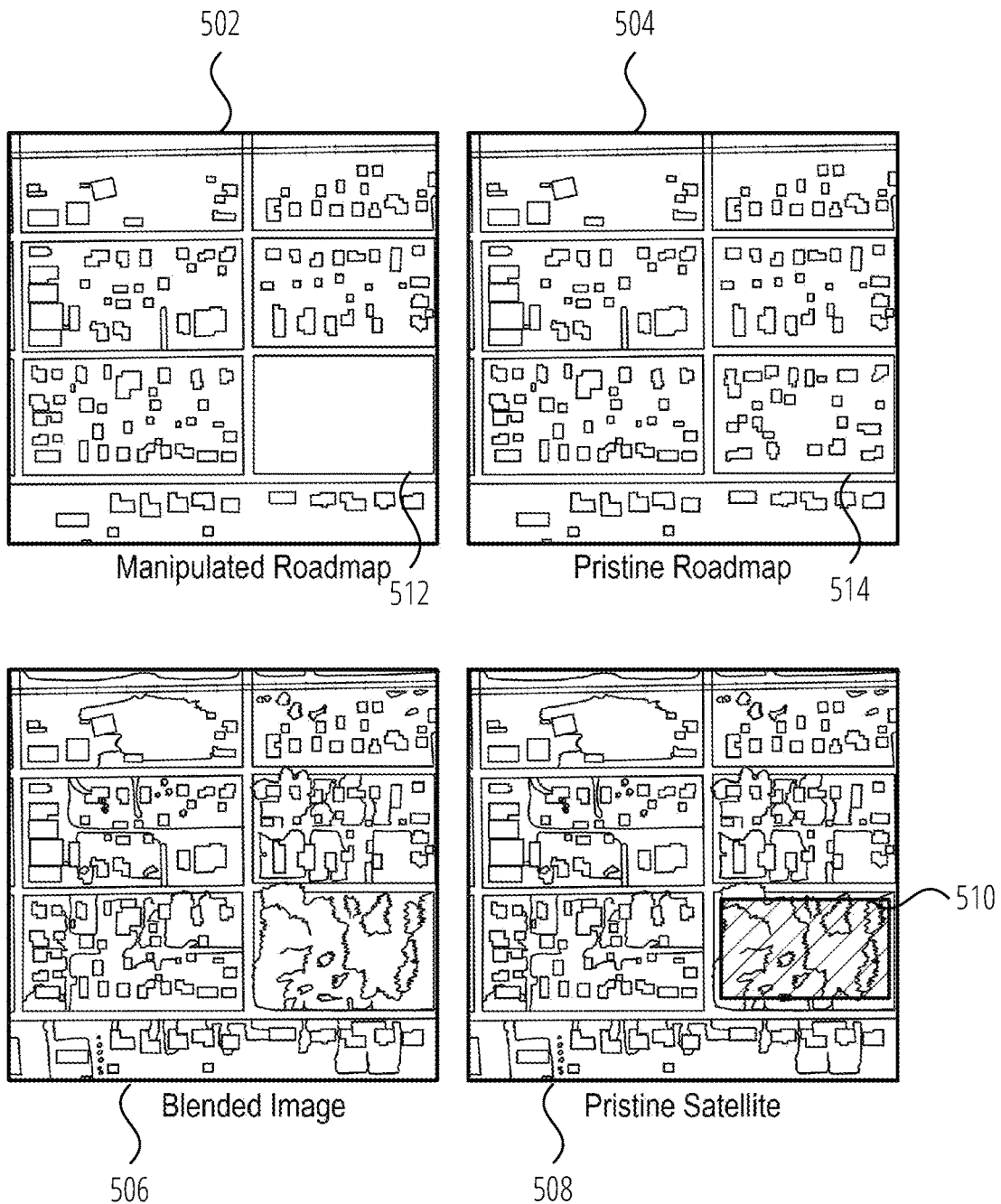
FIG. 5 is an illustration of images accessed and generated by the image generation system, in accordance with some examples.

FIG. 5 is an illustration of images accessed and generated by the image generation system 118. The image generation system 118 accesses the pristine roadmap 504 and modifies the region 514 to generate a manipulated roadmap 502 that has a manipulated region 512. As shown in the figures, the modification includes removing all buildings from region 514. The manipulated roadmap 502 is provided as input to the GAN model 204. The GAN model 204 generates a deepfake satellite image (not pictured). The deepfake satellite image is blended with the pristine satellite image 508. The pristine satellite image 508 is shown to highlight the region 510 marked by a thick solid boundary that is being manipulated. The region 510 corresponds to the region 514. The image generation system 118 blends the pristine satellite image 508 with the GAN-generated deepfake satellite image to generate the blended satellite image 506.

Machine Architecture

Figure 6:
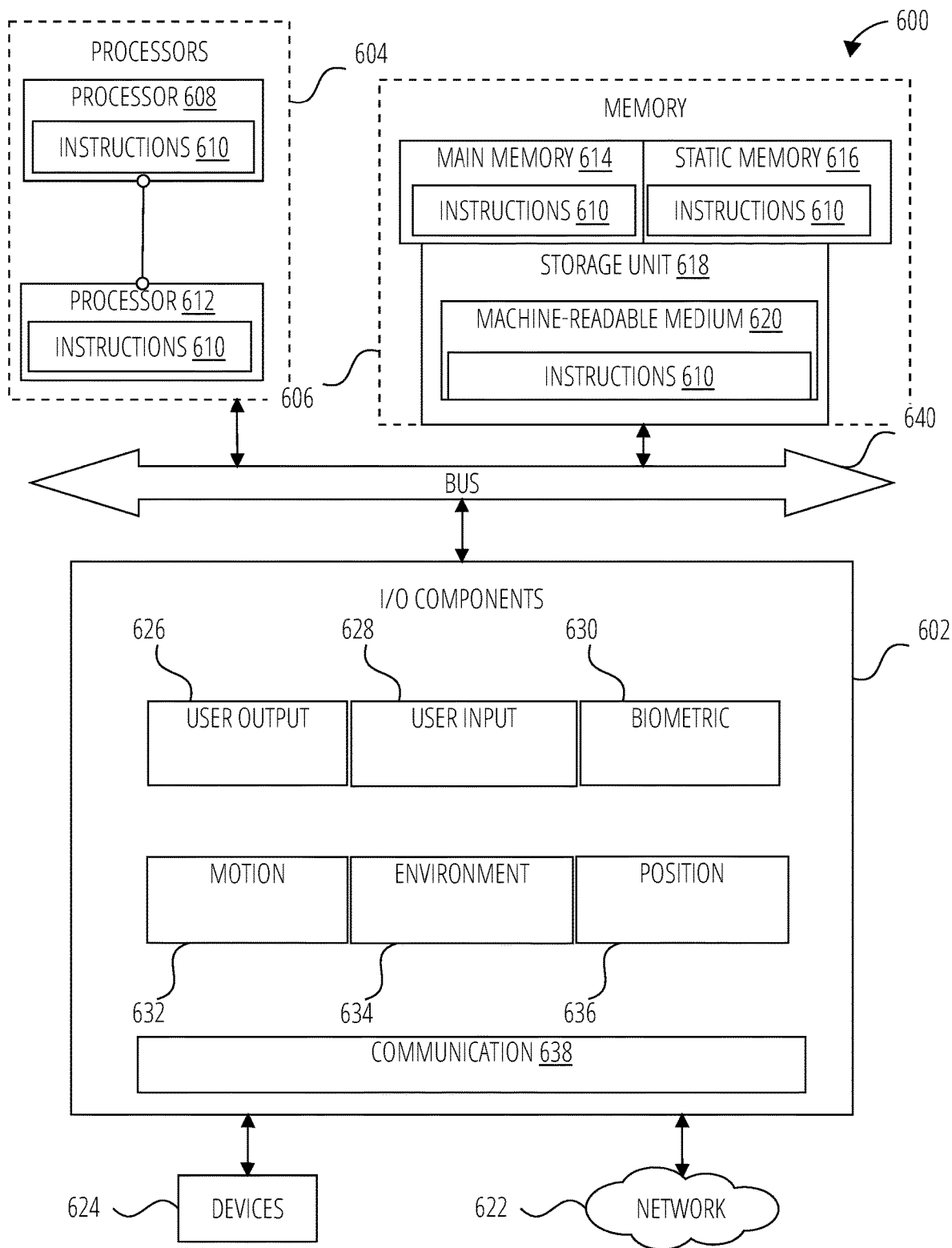
FIG. 6 is a diagrammatic representation of a machine in the form of a computer system within which a set of instructions may be executed for causing the machine to perform any one or more of the methodologies discussed herein, in accordance with some examples.

FIG. 6 is a diagrammatic representation of the machine 600 within which instructions 610 (e.g., software, a program, an application, an applet, an app, or other executable code) for causing the machine 600 to perform any one or more of the methodologies discussed herein may be executed. For example, the instructions 610 may cause the machine 600 to execute any one or more of the methods described herein. The instructions 610 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 610, sequentially or otherwise, that specify actions to be taken by the machine 600. Further, while only a single machine 600 is illustrated, the term "machine" shall also be taken to include a collection of machines that individually or jointly execute the instructions 610 to perform any one or more of the methodologies discussed herein. The machine 600, for example, may comprise the client device 102 or any one of a number of server devices forming part of the server system 106. In some examples, the machine 600 may also comprise both client and server systems, with certain operations of a particular method or algorithm being performed on the server-side and with certain operations of the particular method or algorithm being performed on the client-side.

The machine 600 may include processors 604, memory 606, and input/output I/O components 602, which may be configured to communicate with each other via a bus 640. In an example, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 608 and a processor 612 that execute the instructions 610. The term "processor" is intended to include multi-core processors that may comprise two or more independent processors (sometimes referred to as "cores") that may execute instructions contemporaneously. Although FIG. 6 shows multiple processors 604, the machine 600 may include a single processor with a single-core, a single processor with multiple cores (e.g., a multi-core processor), multiple processors with a single core, multiple processors with multiples cores, or any combination thereof.

The memory 606 includes a main memory 614, a static memory 616, and a storage unit 618, both accessible to the processors 604 via the bus 640. The main memory 606, the static memory 616, and storage unit 618 store the instructions 610 embodying any one or more of the methodologies or functions described herein. The instructions 610 may also reside, completely or partially, within the main memory 614, within the static memory 616, within machine-readable medium 620 within the storage unit 618, within at least one of the processors 604 (e.g., within the Processor's cache memory), or any suitable combination thereof, during execution thereof by the machine 600.

The I/O components 602 may include a wide variety of components to receive input, provide output, produce output, transmit information, exchange information, capture measurements, and so on. The specific I/O components 602 that are included in a particular machine will depend on the type of machine. For example, portable machines such as mobile phones may include a touch input device or other such input mechanisms, while a headless server machine will likely not include such a touch input device. It will be appreciated that the I/O components 602 may include many other components that are not shown in FIG. 6. In various examples, the I/O components 602 may include user output components 626 and user input components 628. The user output components 626 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 628 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 602 may include biometric components 630, motion components 632, environmental components 634, or position components 636, among a wide array of other components. For example, the biometric components 630 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 632 include acceleration sensor components (e.g., accelerometer), gravitation sensor components, rotation sensor components (e.g., gyroscope).

The environmental components 634 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 636 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 602 further include communication components 638 operable to couple the machine 600 to a network 622 or devices 624 via respective coupling or connections. For example, the communication components 638 may include a network interface Component or another suitable device to interface with the network 622. In further examples, the communication components 638 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 624 may be another machine or any of a wide variety of peripheral devices (e.g., a peripheral device coupled via a USB).

Moreover, the communication components 638 may detect identifiers or include components operable to detect identifiers. For example, the communication components 638 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 638, such as location via Internet Protocol (IP) geolocation, location via Wi-Fi® signal triangulation, location via detecting an NFC beacon signal that may indicate a particular location, and so forth.

The various memories (e.g., main memory 614, static memory 616, and memory of the processors 604) and storage unit 618 may store one or more sets of instructions and data structures (e.g., software) embodying or used by any one or more of the methodologies or functions described herein. These instructions (e.g., the instructions 610), when executed by processors 604, cause various operations to implement the disclosed examples.

The instructions 610 may be transmitted or received over the network 622, using a transmission medium, via a network interface device (e.g., a network interface component included in the communication components 638) and using any one of several well-known transfer protocols (e.g., hypertext transfer protocol (HTTP)). Similarly, the instructions 610 may be transmitted or received using a transmission medium via a coupling (e.g., a peer-to-peer coupling) to the devices 624.

Software Architecture

Figure 7:
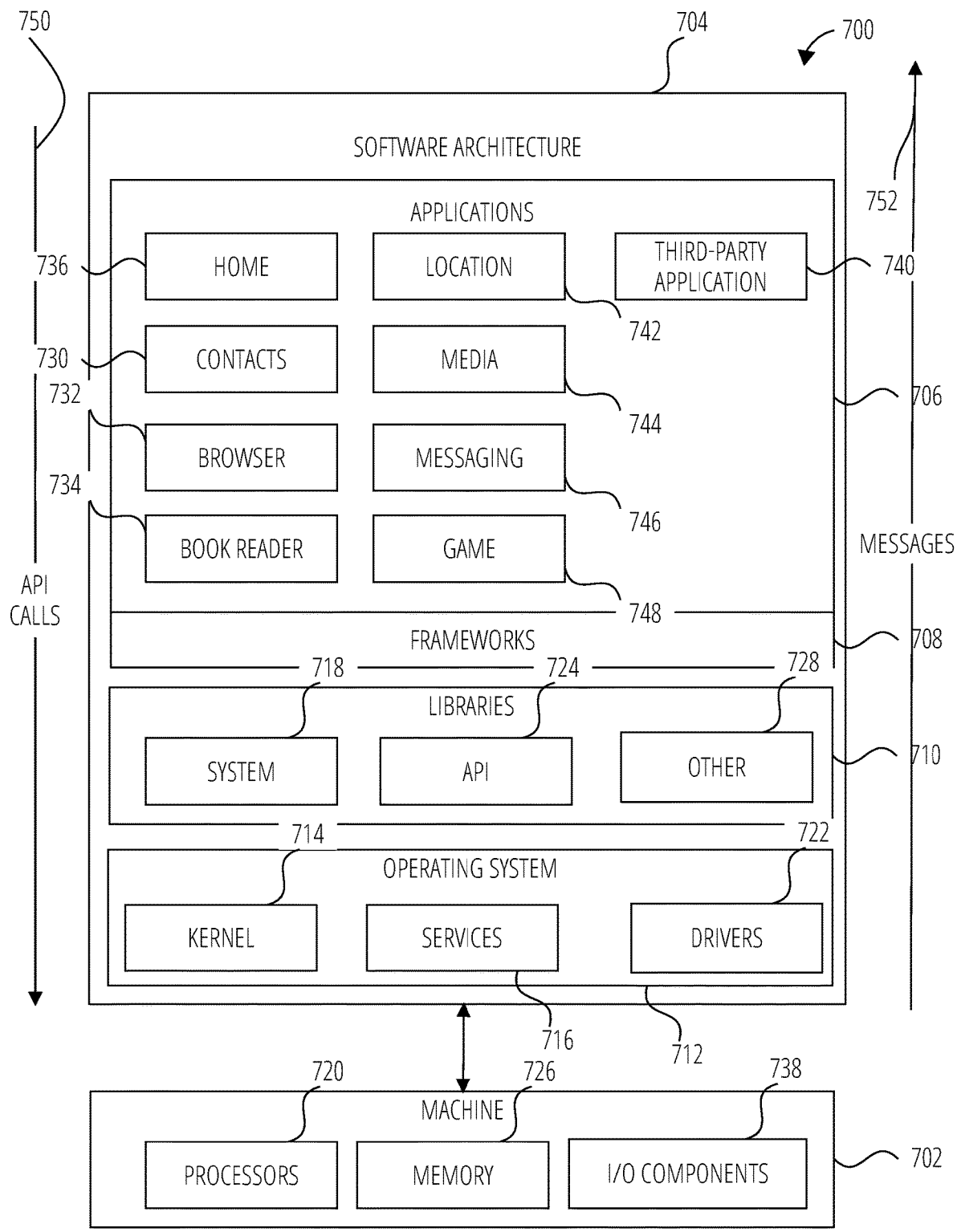
FIG. 7 is a block diagram showing a software architecture within which examples may be implemented.

FIG. 7 is a block diagram 700 illustrating a software architecture 704, which can be installed on any one or more of the devices described herein. The software architecture 704 is supported by hardware such as a machine 702 that includes processors 720, memory 726, and I/O components 738. In this example, the software architecture 704 can be conceptualized as a stack of layers, where each layer provides a particular functionality. The software architecture 704 includes layers such as an operating system 712, libraries 710, frameworks 708, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionality. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 710 provide a common low-level infrastructure used by the applications 706. The libraries 710 can include system libraries 718 (e.g., C standard library) that provide functions such as memory allocation functions, string manipulation functions, mathematic functions, and the like. In addition, the libraries 710 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 710 can also include a wide variety of other libraries 728 to provide many other APIs to the applications 706.

The frameworks 708 provide a common high-level infrastructure that is used by the applications 706. For example, the frameworks 708 provide various graphical user interface (GUI) functions, high-level resource management, and high-level location services. The frameworks 708 can provide a broad spectrum of other APIs that can be used by the applications 706, some of which may be specific to a particular operating system or platform.

In an example, the applications 706 may include a home application 736, a contacts application 730, a browser application 732, a book reader application 734, a location application 742, a media application 744, a messaging application 746, a game application 748, and a broad assortment of other applications such as a third-party application 740. The applications 706 are programs that execute functions defined in the programs. Various programming languages can be employed to create one or more of the applications 706, structured in a variety of manners, such as object-oriented programming languages (e.g., Objective-C, Java, or C++) or procedural programming languages (e.g., C or assembly language). In a specific example, the third-party application 740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 740 can invoke the API calls 750 provided by the operating system 712 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
    accessing map image data that comprises a plurality of pixels associated with a plurality of map item labels;
    accessing satellite image data associated with the map image data;
    manipulating at least a portion of map item labels of the plurality of map item labels to generate manipulated map image data;
    training a machine learning framework using a set of map and satellite image pairs, the set of map and satellite image pairs depicting a geographic region visually similar to the accessed map image data and the accessed satellite image data;
    using the trained machine learning framework to generate manipulated satellite image data based on the manipulated map image data;
    generating a blended satellite image based on a combination of the manipulated satellite image data and the accessed satellite image data; and
    storing the blended satellite image.

2. The method of claim 1, wherein the machine learning framework is a generative adversarial network (GAN).

3. The method of claim 1, wherein the manipulating at least the portion of map item labels further comprises:
    at least one of removing, inserting or replacing an object depicted in the accessed map image data from the accessed map image data.

4. The method of claim 1, wherein the set of map and satellite image pairs comprises only the accessed map image data and the accessed satellite image data.

5. The method of claim 1, wherein the blended satellite image is generated based on the combination of the manipulated satellite image data and a second satellite image from the set of map and satellite image pairs.

6. The method of claim 1, wherein the geographic region visually similar to the accessed map image data and the accessed satellite image data comprises a same set of natural geographic features and engineered geographic features as the accessed map image data and the accessed satellite image data.

7. The method of claim 1, wherein the set of map and satellite image pairs comprise images that are captured from location coordinates that are within a predefined radius of location coordinates associated with the accessed map image data and the accessed satellite image data.

8. A system comprising:
one or more hardware processors; and
a memory storing instructions that, when executed by the one or more hardware processors, configure the system to perform operations comprising:
accessing map image data that comprises a plurality of pixels associated with a plurality of map item labels;
accessing satellite image data associated with the map image data;
manipulating at least a portion of map item labels of the plurality of map item labels to generate manipulated map image data;
training a machine learning framework using a set of map and satellite image pairs, the set of map and satellite image pairs depicting a geographic region visually similar to the accessed map image data and the accessed satellite image data;
using the trained machine learning framework to generate manipulated satellite image data based on the manipulated map image data;
generating a blended satellite image based on a combination of the manipulated satellite image data and the accessed satellite image data; and
storing the blended satellite image.

9. The system of claim 8, wherein the machine learn framework is a generative adversarial network (GAN).

10. The system of claim 8, wherein the manipulating at least the portion of map item labels further comprises:
at least one of removing, inserting or replacing an object depicted in the accessed map image data from the accessed map image data.

11. The system of claim 8, wherein the set of map and satellite image pairs comprises only the accessed map image data and the accessed satellite image data.

12. The system of claim 8, wherein the blended satellite image is generated based on the combination of the manipulated satellite image data and a second satellite image from the set of map and satellite image pairs.

13. The system of claim 8, wherein the geographic region visually similar to the accessed map image data and the accessed satellite image data comprises a same set of natural geographic features and engineered geographic features as the accessed map image data and the accessed satellite image data.

14. The system of claim 8, wherein the set of map and satellite image pairs comprise images that are captured from location coordinates that are within a predefined radius of location coordinates associated with the accessed map image data and the accessed satellite image data.

15. A non-transitory computer-readable storage medium, the non-transitory computer-readable storage medium including instructions that when executed by a computer, cause the computer to perform operations comprising:
accessing map image data that comprises a plurality of pixels associated with a plurality of map item labels;
accessing satellite image data associated with the map image data;
manipulating at least a portion of map item labels of the plurality of map item labels to generate manipulated map image data;
training a machine learning framework using a set of map and satellite image pairs, the set of map and satellite image pairs depicting a geographic region visually similar to the accessed map image data and the accessed satellite image data;
using the trained machine learning framework to generate manipulated satellite image data based on the manipulated map image data;
generating a blended satellite image based on a combination of the manipulated satellite image data and the accessed satellite image data; and
storing the blended satellite image.

16. The non-transitory computer-readable storage medium of claim 15, wherein the machine learning framework is a generative adversarial network (GAN).

17. The non-transitory computer-readable storage medium of claim 15, wherein the manipulating at least the portion of map item labels further comprises:
at least one of removing, inserting or replacing an object depicted in the accessed map image data from the accessed map image data.

18. The non-transitory computer-readable storage medium of claim 15, wherein the set of map and satellite image pairs comprises only the accessed map image data and the accessed satellite image data.

19. The non-transitory computer-readable storage medium of claim 15, wherein the blended satellite image is generated based on the combination of the manipulated satellite image data and a second satellite image from the set of map and satellite image pairs.

20. The non-transitory computer-readable storage medium of claim 15, wherein the geographic region visually similar to the accessed map image data and the accessed satellite image data comprises a same set of natural geographic features and engineered geographic features as the accessed map image data and the accessed satellite image data.

* * * * *